Patented Apr. 2, 1940

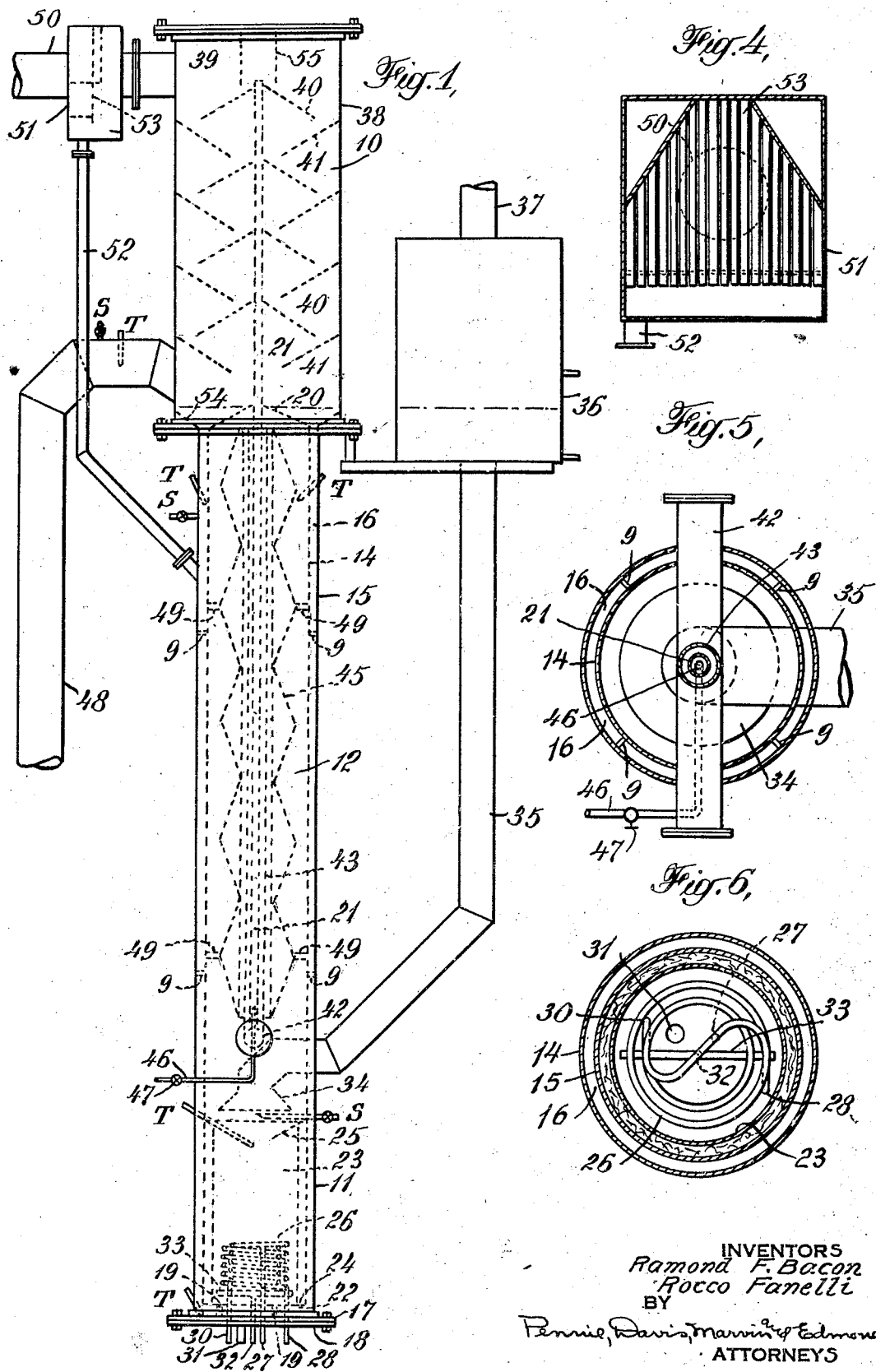

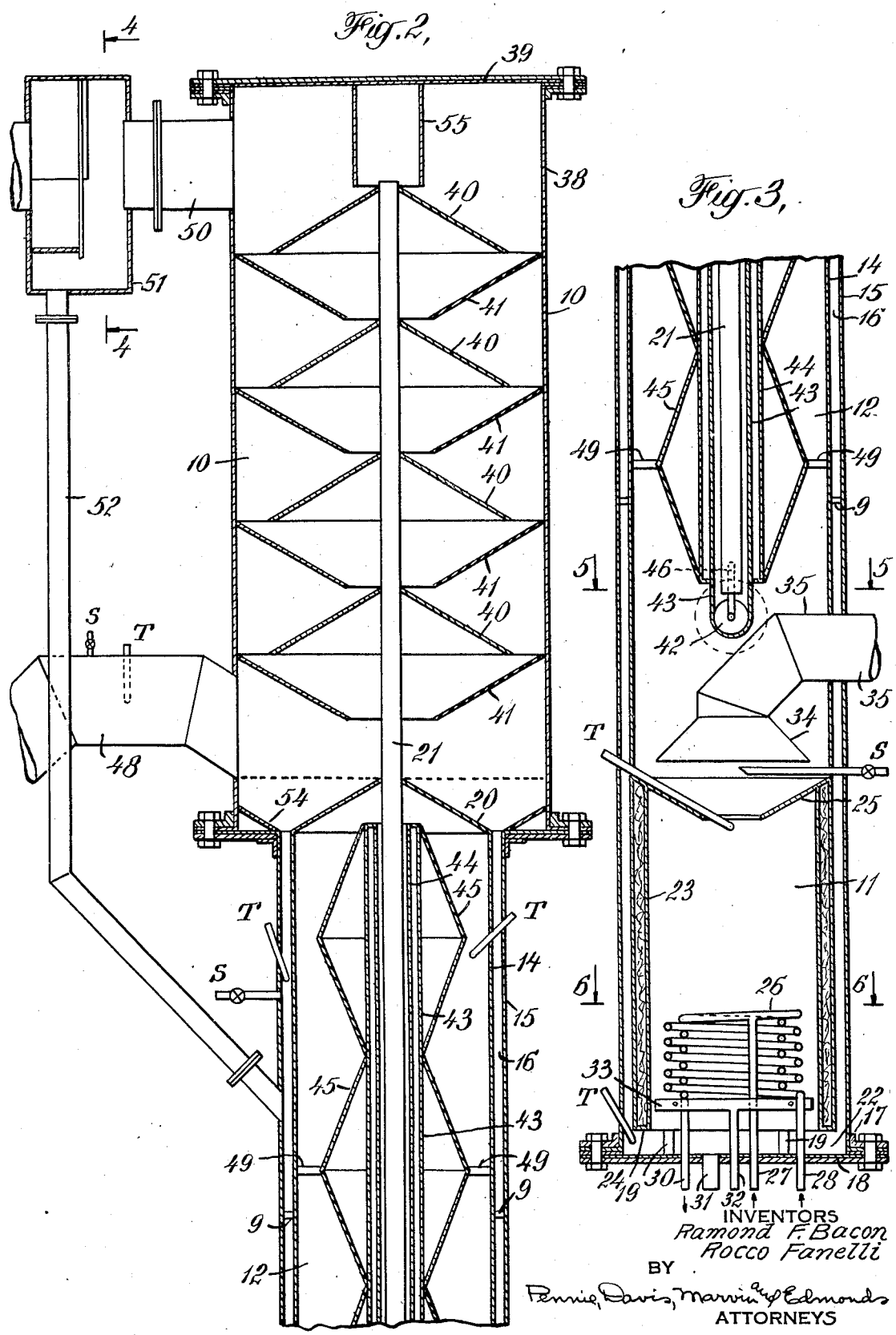

2,195,980

UNITED STATES PATENT OFFICE 2,195,980

RECOVERY OF SULPHUR DIOXIDE

Raymond F. Bacon, Bronxville, and Rocco Fanelli, New Rochelle, N. Y.; said Fanelli assignor to said Bacon Application January 21, 1938, Serial No. 186,014

7 Claims. (Cl. 23—178)

This invention relates to the recovery of sulphur dioxide and has for an object the provision of an improved process for recovering sulphur dioxide from gases containing sulphur dioxide mixed with other gases. The process of the invention may be employed for the recovery of sulphur dioxide from gas mixtures containing sulphur dioxide in any degree of concentration, and it is particularly suitable for the treatment of gas mixtures containing relatively small concentrations of sulphur dioxide such, for example, as gas mixtures resulting from the roasting of pyrites and other sulphide ores and concentrates and other metallurgical raw materials and products containing metal sulphides.

The process of the invention may be employed to produce a substantially pure sulphur dioxide product, in either gaseous or liquid form, or to produce gaseous products containing sulphur dioxide in any suitable proportions. The invention provides an effective and economical method for producing sulphur dioxide for various chemical and metallurgical uses as, for example, for producing sulphuric acid, for producing sulphite cooking liquors, for producing elemental sulphur by reduction of the sulphur dioxide, for refrigeration and for the leaching of ores. The invention further provides an effective and economical method of reducing or eliminating the injurious effects resulting from discharging roaster and other smelter gases into the atmosphere, and, at the same time, permits the recovery in useful form of an important component of such injurious gases.

The process of the invention is of the type in which gases containing sulphur dioxide are treated with a liquid solvent or absorbent, and the absorbed sulphur dioxide is expelled by heating, the regenerated solvent or absorbent being used for the treatment of additional quantities of gases.

This invention is based on our discovery that borax (sodium tetraborate) and boric acid (boracic acid, $H_3BO_3$) may be employed to form highly efficient and effective chemical systems for the alternate absorption and liberation of sulphur dioxide. We have discovered that boric acid can be employed to reverse sulphur dioxide absorption reactions rapidly and effectively. We have discovered, also, that free boric acid present in absorption solutions containing borax does not interfere with or retard the absorption of sulphur dioxide even at relatively very high temperatures, while only a relatively small increase in temperature over the highest effective absorption temperature is sufficient to cause the boric acid to become highly effective in reversing the absorption reactions.

The invention provides a process employing inexpensive reagents to produce a chemical system of high absorptive capacity, capable of permitting high and efficient transfer of sulphur dioxide through rapid and thorough absorption and liberation of the sulphur dioxide and requiring only small differences in the temperatures employed in the absorption and liberation or stripping operations. A preferred process of the invention employs a chemical system in which both borax and free boric acid are dissolved or suspended or dissolved and suspended in a suitable liquid medium during both the absorption operation and the liberation operation.

The borax employed for absorption may be dissolved or suspended in any suitable liquid medium. The borax may be only slightly soluble in the liquid medium employed or the liquid medium employed may be a solvent for the borax. When a solvent for the borax is employed as the liquid medium, the borax may be employed in an amount sufficient to partially or completely saturate the liquid at the absorption temperature or the borax may be employed in an amount in excess of that required to saturate the liquid at the absorption temperature. The liquid medium employed should be one in which the boric acid employed is soluble to some extent. Preferably, water is the liquid medium employed.

The terms "solution" and "mixture" are employed herein broadly as equivalents, a solution being considered a mixture of solvent and solute, and a mixture of liquid medium and undissolved reagent being considered as a mixture of solution and undissolved reagent. On this basis, each of these terms may be considered as referring to or defining broadly both a true solution of reagent in liquid medium free of undissolved reagent, and a mixture of undissolved reagent and liquid medium containing in solution a greater or lesser amount of reagent.

The amount of borax dissolved or suspended or both dissolved and suspended in the liquid medium will depend upon the results sought to be accomplished. Generally, the larger the amount of borax employed relatively to or in proportion to the volume of liquid medium employed, as, for example, in the case of water, the greater will be the absorption capacity of the solution or mixture. For economic reasons, it is preferable to employ an absorption solution or mixture containing borax of the highest absorption capacity consistent with the proper operation of the process and the proper functioning of the apparatus employed.

The boric acid may be employed in any amount which will accelerate the liberation of sulphur dioxide. We have employed effectively amounts of boric acid equal to about 25; 50; 75 and 100 percent of the amount required to saturate the absorption solution at its boiling temperature at the conclusion of the stripping operation. We have found that the rate of liberation of sulphur dioxide is roughly proportional to the amount of boric acid present up to the point of saturation of the absorption solution at the boiling temperature of the solution, the sulphur dioxide being liberated more effectively and more completely in a given short period of time when the absorption solution is substantially saturated at the boiling temperature with the boric acid employed.

It is to be understood that, in referring to the presence of boric acid, or free boric acid, or excess boric acid, in the absorption solution during the absorption operation or during the liberating or stripping operation, we mean free boric acid in an amount in excess of the amount which may be liberated by reaction of the sulphur dioxide with the borax employed as the absorption agent or otherwise produced as a product of the particular chemical environment. Results tabulated below show that unless free boric acid, as defined above, is present in substantial quantity, the recovery of sulphur dioxide in the liberation or stripping stage of the process is very low. When borax is employed, boric acid is liberated through reaction of the sulphur dioxide with the borax and possibly by hydrolysis and dissociation. The boric acid which we employ for aiding in liberating absorbed sulphur dioxide is not to be confused with acid resulting naturally from solution of borax employed for absorption or resulting from reaction of sulphur dioxide with borax in solution.

The absorption operation, employing borax, may be carried out at any suitable temperature. At temperatures of 20° C.; 45° C.; 50° C.; 55° C.; 60° C. and 70° C. and in the presence of excess boric acid sufficient to saturate the absorption solutions at their boiling temperatures, we have absorbed amounts of sulphur dioxide substantially equal to the theoretical capacities of the borax solutions employed; and at a temperature of 80° C., but with other conditions the same, we have absorbed amounts of sulphur dioxide equal to about 70 percent of the theoretical capacities of the borax solutions employed. Our researches have indicated that the tendency of boric acid to reverse the absorption reaction is not pronounced at temperatures below 80° C. This is a very great advantage of our absorption systems as compared with other proposed absorption systems where the temperature differences for good absorption and good liberation of sulphur dioxide are very great as compared with those differences permissible in employing our systems to achieve equivalent results.

For the liberation of sulphur dioxide, the solution may be heated to any suitable temperature at which the boric acid causes effective reversal of the absorption reactions. We may liberate the sulphur dioxide very rapidly and completely by heating the solutions to their boiling points.

In carrying out a process in accordance with our invention, we may absorb sulphur dioxide at any temperature or temperatures between the freezing points of the solutions and about 75° C., and we may liberate the absorbed sulphur dioxide by heating the solutions to a temperature or to temperatures of about 85° C. up to the boiling points of the solutions at atmospheric or sub-atmospheric pressure. For reasons of economy, in carrying out a process of the invention, the sulphur dioxide usually will be absorbed at about 70° C. to 75° C. and driven off or liberated at as low a temperature as possible above 85° C.

When the amount of boric acid employed is in excess of the amount which is soluble in the absorption solution at the absorption temperature, the excess boric acid may be separated from the absorption solution, after cooling following the liberation step, or the cooled solution may be employed for absorption while in contact with the excess boric acid. If the cooled solution and the excess boric acid are separated, they are mixed again prior to subjecting the solution to the liberation operation. It is characteristic of this absorption solution or mixture that the excess boric acid does not interfere with the absorption of the sulphur dioxide. Just as much sulphur dioxide can be absorbed in the presence of the boric acid as can be absorbed in the absence of boric acid.

The following data show results obtained in employing absorption mixtures or solutions of borax (sodium tetraborate, $Na_2B_4O_7.10H_2O$) as the absorption agent and ortho boric acid (boracic acid, $H_3BO_3$) as the acid aiding in liberating the absorbed sulphur dioxide in the amounts and at the temperatures indicated with water as the liquid medium:

| Concentration of borax solution in moles per liter | Excess boric acid in grams per liter | Grams $SO_2$ absorbed per liter of liquid phase | Temp. of absorption, ° C. | Temp. of liberation, ° C. | Time of liberation in minutes | Percent $SO_2$ liberated and recovered |
|---|---|---|---|---|---|---|
| 0.15 | None | 22.7 | 20 | 100–104 | 5 / 15 | 21.0 / 32.5 |
| 0.15 | 80 | 22.8 | 20 | 100–104 | 5 / 15 | 39.0 / 55.0 |
| 0.15 | 160 | 23.0 | 20 | 100–104 | 5 / 15 | 44.5 / 71.0 |
| 0.15 | 240 | 23.8 | 20 | 100–104 | 5 / 15 | 71.5 / 93.3 |
| 0.15 | 320 | 24.3 | 20 | 100–104 | 5 / 10 | 87.0 / 96.0 |
| 0.15 | 400 | 25.0 | 20 | 100–104 | 5 / 10 | 93.5 / 97.0 |
| 0.15 | 480 | 23.9 | 20 | 100–104 | 5 / 10 | 93.7 / 99.2 |
| 0.5 | None | 66.6 | 45 | 100–103 | 5 / 10 | 9.6 / 16.4 |
| 0.5 | 400 | 72.3 | 45 | 100–103 | 5 / 10 | 79.0 / 88.0 |
| 0.5 | 480 | 71.7 | 45 | 100–104 | 5 | 88.0 / 89.0 |
| 0.5 | 560 | 70.4 | 45 | 100–104 | 5 / 10 | 89.0 / 95.0 |
| 0.85 | 640 | 124.2 | 50 | 100–105 | 5 / 10 | 89.3 / 96.3 |
| 0.85 | 640 | 123.0 | 70 | 100–105 | 5 | 92.5 |
| 0.85 | 640 | 90.2 | 80 | | | |
| 0.85 | 640 | 74.2 | 80 | | | |
| 0.9 | None | 122.4 | 50 | 100–103 | 5 | 15.8 |
| 0.9 | 400 | 129.3 | 50 | 100–104 | 5 / 10 | 72.6 / 79.5 |
| 0.9 | 480 | 131.8 | 50 | 100–103 | 5 | 78.6 |
| 0.9 | 560 | 137.6 | 50 | 100–104 | 5 / 10 | 84.0 / 90.4 |
| 0.9 | 640 | 116.4 | 55 | 100–104 | 5 / 10 | 78.7 / 92.7 |
| 1.0 | 640 | 126.3 | 70 | 100–104 | 5 | 87.6 |
| 1.0 | 640 | 123.7 | 70 | 100–106 | 5 | 92.0 |
| 1.0 | 400 | 129.3 | 60 | | | |
| 1.3 | None | 154.4 | 70 | | | |
| 1.3 | 400 | 139.0 | 75 | | | |
| 1.3 | 680 | 153.3 | 70 | 100–106 | 5 | 90.0 |
| 1.3 | 800 | 175.2 | 60 | 100–106 | 5 | 94.0 |
| 1.3 | 800 | 171.8 | 70 | 100–106 | 5 | 92.0 |
| 1.3 | None | 169.8 | 70 | 100–105 | 5 | 26.7 |
| 1.3 | 400 | 161.3 | 70 | 100–106 | 5 | 76.0 |
| 1.3 | 600 | 162.6 | 70 | 100–107 | 5 | 90.0 |

The above results were obtained in the treatment of gases of the nature of roaster gases containing about 6 to 7 percent of sulphur dioxide. The gases in each case were bubbled rapidly through a pool of the absorption solution about 3 to 4 inches in depth at atmospheric pressure. The absorption of sulphur dioxide by the solutions was very rapid and complete. Liberation of the sulphur dioxide was accomplished by heating the solutions to the temperatures indicated at atmospheric pressure.

In employing borax and boric acid, we prefer to employ, at the temperature of the absorption operation, a two phase absorption medium comprising, as a liquid phase, water saturated with respect to both compounds and containing as a solid phase an excess of one or both compounds in the solid state. In employing these compounds, we may conduct either the absorption operation or the liberation operation or both operations at pressures above or below atmospheric pressure, but we find that both operations go well at prevailing atmospheric pressures.

In carrying out a process in accordance with the invention, we may so control the time of contact of gases and absorption solution as to accomplish absorption of any desired percentage of the sulphur dioxide contained in the gases; we may so control the duration of the absorption operation as to achieve any desired degree of saturation of the absorption solution with sulphur dioxide; and we may so control the liberation operation as to achieve liberation of any desired percentage of sulphur dioxide absorbed in any absorption cycle. It usually is more economical from the standpoint of both operating and apparatus cost to obsorb and liberate the greatest amount possible per unit volume of solution or absorption mixture and our solutions or mixtures are particularly advantageous in this respect, that very large amounts of sulphur dioxide per unit volume can be handled or transferred in one cycle.

As absorption proceeds, the sulphur dioxide and the borax react to liberate boric acid with the production of a sulphite, bisulphite or mixture of sulphite and bisulphite of the metal of the borate, depending upon the degree of absorption as determined by the quantity of sulphur dioxide contacted with the absorption solution or mixture. Sulphite forms first, and, when sufficient sulphur dioxide to form sulphite with all of the metal of the borax has been absorbed, the absorption of additional sulphur dioxide results in the production of bisulphite by reaction with the sulphite. Thus, for example, when sodium tetraborate (borax) is employed in an aqueous medium, sodium sulphite, sodium bisulphite or a mixture of sodium sulphite and sodium bisulphite may be produced, sodium sulphite being formed first by reaction of sulphurous acid formed by the water present and the sulphur dioxide, and sodium bisulphite being formed by reaction of sulphurous acid with the sodium sulphite. The excess boric acid employed functions to reverse the reaction with respect to both the sulphite and bisulphite, bisulphite being first converted to sulphite with the liberation of sulphur dioxide and the sulphite then being decomposed with the liberation of additional sulphur dioxide and the regeneration of the borax. In practicing the invention, we may reverse the absorption reactions to any suitable degree, but we prefer to effect substantially complete reversal of the absorption reactions with the liberation of substantially all of the sulphur dioxide absorbed in each cycle. The absorption solution or mixture will be used repeatedly alternately to absorb and release sulphur dioxide.

In carrying out a process of the invention, the sulphur dioxide-bearing gases may be treated with the absorption solution in any manner known to the art of contacting gases and liquids. Thus, for example, the gases may be passed over the surface of a body of solution, with continuous or intermittent agitation of the solution, the gases may be bubbled through a body of the solution, or the gases and the solution may be passed either co-currently or counter-currently, through a packed or baffle tower in contact with one another.

In commencing the recovery operations in accordance with the invention, the mixture of boric acid and borax may be formed prior to commencement of absorption, or, absorption may be carried out first with borax in the absence of free or excess boric acid and the boric acid added at the commencement of or during the liberation or stripping operation. Thereafter, the boric acid, in whole or in part, will follow the borax through the cycle of operations.

If gases such as roaster gases are being treated, they are preferably cooled to the extent necessary or desirable and treated for the removal of dust and other objectionable impurities contained therein prior to treatment with the absorption solution. The degree of cooling of the gases may often be less than with other absorption solutions or agents because of the higher absorption temperatures permissible in using our solutions or mixtures.

The apparatus employed in carrying out a process of the invention should be so arranged that available heat may be utilized efficiently. Thus, for example, when hot roaster gases are being treated, the heat contained in the gases may be utilized for heating the absorption solution from which sulphur dioxide is to be liberated, and the solution produced in the absorption operation may be heated by the regenerated absorption solution to avoid wasting the heat contained therein.

Heating of the sulphite solution for the purpose of liberating sulphur dioxide may be carried out in any suitable manner. For example, the solution may be heated in a closed receptacle out of contact with other gases, or the solution may be heated by contact with a body or stream of another gas to which it is desired to transfer the sulphur dioxide, or it may be heated by live steam injected into it. In commercial operation, the concentration or volume of the solution should be kept reasonably constant, which requires the addition of water in some form or manner to make up for the water carried away by the gases in the absorption stage. Live steam can be employed in the liberation or stripping stage to perform this additional function in whole or in part.

The gaseous product formed by heating the pregnant absorption solution in a closed receptacle out of contact with other gases is substantially pure sulphur dioxide mixed with some water vapor and it may be utilized for a suitable industrial purpose directly (diluted or undiluted) or it may be cooled to a suitable temperature and compressed to form liquid sulphur dioxide. Water vapor associated with the released sulphur dioxide may be removed in any suitable manner.

Oxidation of sulphur dioxide to sulphate in the process is not excessive under any of the desirable operating temperatures and other conditions. Sulphate removal can be carried out rather simply by cooling to atmospheric temperature or lower a portion of the absorption medium bled from the system either continuously or intermittently with the formation of a solid phase consisting essentially of borax and boric acid and a liquid phase containing mainly sodium sulphate. Further precipitation of boric acid from the liquid phase can be accomplished by treating it with sulphur dioxide. The precipitate of boric acid and borax is returned to the system with sufficient additional borax and boric acid to compensate for losses due to various causes and with the desirable amount of water.

Apparatus suitable for carrying out a process in accordance with the invention, which apparatus is the invention of one of us (Raymond F. Bacon) is illustrated in the accompanying drawings in which Fig. 1 is an elevation of a combined absorption, liberation and heat exchanging tower;

Fig. 2 is a sectional elevation of the upper portion of the apparatus shown in Fig. 1;

Fig. 3 is a sectional elevation of the lower portion of the apparatus shown in Fig. 1;

Fig. 4 is a sectional elevation of a moisture trap for removing entrained liquid from gases leaving the apparatus;

Fig. 5 is a section taken substantially along the line 5—5 of Fig. 3; and

Fig. 6 is a section taken substantially along the line 6—6 of Fig. 3.

The apparatus shown in the drawings includes a substantially vertical tower comprising three main elements or sections, namely, an absorption section 10 adjacent the top, a liberating or stripping section 11 adjacent the bottom and a heat exchange section 12 disposed mainly between the absorption section 10 and the liberating or stripping section 11 but having its lower portion surrounding the outer walls of the stripping or liberating section.

The heat exchange section comprises an inner vertically disposed cylinder 14 and an outer cylinder 15 surrounding the inner cylinder and disposed in axial alignment therewith with its inner wall spaced from the outer wall of the inner cylinder to form an annular passage 16 for the flow of liquid therethrough. The outer cylinder 15 is provided at its lower end with a flange 17 which is bolted to a closure plate 18 with a suitable gasket disposed between the flange and the closure plate to provide a fluid tight joint. The inner cylinder is supported adjacent its upper end by means of a substantially frusto-conical closure member 20 rigidly attached to its peripheral edge and to an air lift conduit or pipe 21 (to be described hereinafter) which extends vertically in axial alignment with the inner cylinder 14 and with the frusto-conical closure member 20 to form fluid tight joints. The lower end of the inner cylinder 14 is spaced above the bottom closure plate 18 to provide a fluid passage 22 therebetween communicating with the annular passage 16 between the inner cylinder 14 and the outer cylinder 15 and with the interior of the liberating or stripping section 11. Additional means in the form of spaced brackets 9 extending between and attached to the inner walls of the inner and outer cylinders 14 and 15 by spot welding and spaced supporting elements 19 disposed between the lower end of the inner cylinder and the bottom closure plate 18 are provided for aiding in supporting the inner cylinder.

The liberating or stripping section or chamber 11 is disposed in the lower end portion of the inner cylinder 14, its outer wall being formed by the lower portion of the inner cylinder, and its inner wall being formed by a relatively short cylinder 23 extending vertically in axial alignment with the inner cylinder 14 with its outer cylindrical surface spaced from the inner surface of the inner cylinder. The space between the inner cylinder 14 and the stripping chamber cylinder 23 is filled with a suitable heat insulating material such as infusorial earth or slag wool. Its lower end is closed by means of an annular plate 24 and its upper end by the outer peripheral edge portion of an inverted frusto-conical closure member 25 having a central opening therein providing a passage for the flow of liquid between the interior stripping chamber and the interior of the heat exchange section of the apparatus. Both closure members form fluid tight joints between the inner cylinder 14 and the stripping chamber cylinder 23.

A closed heating coil 26 is mounted within the stripping chamber 11 adjacent the bottom thereof. Steam conduits 27 and 28 extending through the bottom closure plate 18 are provided for introducing steam under pressure from a suitable source (not shown) into the heating coil element 26. A conduit 30 extending through the closure plate 18 provides an outlet for the steam heating element 26. A relatively large conduit 31 communicating with the interior of the stripping chamber 11 through the closure plate 18 provides means for introducing liquid into the apparatus and for draining the apparatus. A steam conduit 32 extends through the closure plate 18 into the interior of the stripping chamber and communicates below the heating element 26 with a transversely extending header 33 closed at its ends, but having two or more upwardly opening passages adjacent its ends directly below the inner and outer portions of the coils of the heating element 26. The conduit 32 and header 33 provide means for introducing live steam into the absorption solution to aid in liberating sulphur dioxide and to provide a portion, at least, of the make-up water required to compensate for evaporation when an aqueous medium is employed for absorption. This open heating unit aids to some extent in preventing solids suspended in liquid within the apparatus from settling on the coils.

A downwardly opening hood 34 is mounted above the central opening in the inverted frusto-conical upper closure member 25 of the stripping chamber. The hood communicates with a relatively large conduit 35 which extends upwardly, exteriorly of the outer cylinder 15, to a point slightly below the top of the heat exchange section 12 where it joins and communicates with the interior of a gas separating chamber 36. The chamber 36 extends upwardly to a point above the lower portion of the absorption section 10. A gas conduit 37 communicates with the interior of the separating chamber 36 at the top and with suitable gas collection apparatus (not shown).

The absorption section 10 comprises an outer cylinder 38 having a flanged lower end bolted to a flange mounted on the upper end portion of the outer cylinder 15 of the heat exchange section with a suitable gasket disposed between the flanges to provide a fluid tight joint.

The cylinder 38 is flanged at the top and closed by means of a plate 39 bolted to the flange with a suitable gasket between the flange and plate to provide a fluid tight joint.

The tower, comprising the absorption, heat exchange and stripping sections, is mounted on and maintained in vertical position by suitable supporting means (not shown).

The absorption section 10 comprises a series of alternately erect and inverted frusto-conical baffle members 40 and 41, respectively, suitably spaced apart, provided with central openings and supported within the cylinder 38. The baffle members 40 and 41 may be provided with water cooling means (not shown). The baffles 40 are smaller in diameter than the inner diameter of the cylinder 38, and they are supported by the air lift conduit 21 by attachment of the peripheral edges of their central openings thereto. The baffles 41 are of the same diameter as the inner diameter of the cylinder 38, and they are attached at their peripheral edges to the wall of the cylinder 38. The lower peripheral portion of the cylinder 38 is blocked off by an inverted frusto-conical filler member 54 which provides a smooth upper surface inclined downwardly toward the annular heat exchanger passage 16. A cylindrical member 55 disposed in axial alignment with the air lift conduit 21 functions to restrict the spraying of liquid issuing from that conduit and to direct the liquid to the central portion of the upper baffle 40.

The air lift conduit 21 extends from a point adjacent to but spaced from the top of the cylinder 38 to a point adjacent the hood 34 where it communicates with the interior of a conduit 42, which forms an air lift well or sump, extending transversely through the heat exchange section and closed at its outer ends. The air lift conduit 21 extends axially through a cylindrical casing 43, with its walls spaced from the walls of the casing, which casing extends from a point near but spaced from the top of the heat exchange section to the sump 42 with which it communicates through a fluid tight joint. The space between the air lift conduit 21 and the surrounding casing 43 forms an annular passage open at the top and communicating at the bottom with the interior of the sump 42.

The casing 43 is surrounded by a cylindrical conduit 44 with its walls spaced therefrom and with its ends joined to the ends of the cylindrical conduit to form a sealed space for heat insulation purposes. The space between the casing 43 and the conduit 44 may be filled with a heat insulating material such, for example, as cellite, or means (not shown) may be provided for circulating a cooling fluid such as water therethrough. A series of baffles 45 in the form of connected alternately erect and inverted frusto-conical elements formed of sheet material and open at their ends are mounted on and surround the cylindrical conduit 44. The baffles 45 are attached to the conduit 44 adjacent the peripheral edges of their reduced portions to form fluid tight seals, thus providing additional heat insulation for the casing 43. These baffles provide a tortuous path of travel for liquid flowing upwardly within the inner cylinder 14 of the heat exchange section of the apparatus. The baffles serve to cause desirably thorough contact of such liquid with the inner surface of the inner cylinder 14. The assembly comprising the baffles 45, the casing 43 and the conduit 44 is supported in position by means of brackets 49 extending between the baffles 45 and the inner cylinder 14, the brackets 49 being employed in number and size sufficient to afford suitable support for the assembly without obstructing the passage between the assembly and the inner cylinder.

A pipe 46 of small diameter connected with a supply of gas under pressure (not shown) extends through the sump 42 from the exterior of the apparatus and projects upwardly a short distance into the air lift conduit 21, the joints formed at the points where the conduit 46 passes through walls of the apparatus being made fluid tight. A suitable valve 47 is provided for controlling the flow of gas through the conduit 46. The source of gas to which the conduit 46 is connected may consist of gas containing sulphur dioxide from the same source as that of the gas undergoing treatment in the process for the recovery of its sulphur dioxide content.

A conduit 48 is provided for introducing gases containing sulphur dioxide into the lower portion of the absorption section. A conduit 50 having a trap 51 disposed therein is provided for conducting gases from the absorption section. A conduit 52 communicates with the bottom of the trap 51 and with the annular space 16 of the heat exchange section to return to the system liquid separated from the exit gases. The trap 51 comprises a chamber provided with a series of baffles 53 disposed in the path of travel of gases therethrough to remove from the gases liquid particles suspended therein by reduction of velocity through change of direction.

Thermometer or pyrometer wells, indicated by the letter T, and conduits and valves to permit sampling, indicated by the letter S, are disposed at suitable points in the apparatus to aid in controlling the operation of the apparatus.

It is to be understood that the apparatus is provided with all valves and other control elements necessary for its successful operation and that all joints are fluid tight where necessary. Gaskets employed may be formed of rubber, and valves may be formed of hard rubber or other suitable corrosion resistant material. All structural elements of the apparatus which contact the absorption solution or mixture are formed of a suitable corrosion resistant material such as 18—8 stainless steel. The nature of the apparatus is such that relatively thin and light sheet steel may be used in its construction. All inner surfaces are smooth and the surfaces above the base are disposed either vertically or at relatively large angles to the horizontal to prevent local accumulations of solids which may be suspended in the absorption medium.

In the operation of the apparatus, a solution of borax and boric acid in water, preferably saturated with respect to both compounds at its boiling temperature, is introduced at its boiling temperature through the bottom inlet 31 in an amount sufficient to fill the apparatus to a depth slightly greater than that indicated by the liquid level lines shown in the lower portions of the absorber section 10 and the gas separating chamber 36. The amount or volume of solution introduced should be sufficient to maintain a depth substantially equal to that indicated by the liquid level lines when the apparatus is in operation. When the desired amount of solution has been introduced, solution will be present in the air lift sump 42 and conduit 21, in the annular passage surrounding the air lift conduit 21, in the space between the baffles 45 and the inner cylinder 14, in the annular passage between the inner cylinder 14 and the outer cylinder 15, and in the conduit 35 and gas separating chamber 36.

The temperature of the solution remaining in the liberation or stripping section 11 after the desired amount of solution has been introduced is maintained by introducing steam under proper pressure into the heating coil, steam being introduced into the liquid through the header 33 only when such introduction will not cause undesirable dilution of the solution. Some steam can be introduced into the solution through the header 33 constantly during the operation of the apparatus, the rate of introduction being determined by the rate of loss of water from the solution by evaporation and otherwise.

Before starting the operation of the apparatus, the solution in the upepr portion of the apparatus may be permitted to cool to a desirable absorption temperature, say to a temperature of about 50° C., or operation may be started immediately and temperature conditions allowed to adjust themselves during controlled operation.

Operation of the apparatus is started by introducing gas under pressure, preferably a portion of the sulphur dioxide-bearing gas to be treated, into the air lift conduit 21 through the small conduit or injector tube 46 extending into the air lift conduit 21. When the gas under pressure is thus introduced, solution flows upwardly to the top of the absorption section 10 and downwardly therefrom to the lower portion of the absorption section, over the baffles 40 and 41 and into the annular passage 16 between the inner and outer cylinders 14 and 15 of the heat exchanger section. When flow of solution through the absorber section has been established, gas to be treated for the recovery of sulphur dioxide contained therein is introduced into the lower portion of the absorber section through the gas inlet conduit 48, the gas thus introduced passing upwardly through the absorber countercurrently to the flow of solution.

The solution follows a tortuous path over the baffles 40 and 41 in the form of thin films of very large area. The ascending gases follow a similar path in reverse direction and in a state of great turbulence which results in thorough and intimate contact of the gases and solution.

The sulphur dioxide contained in the gases is absorbed by the solution, and the residual gases pass to waste through the exit conduit 50 and the baffle chamber 51.

Precipitation of boric acid which may result from the absorption reactions does not interfere with the flow of gas and solution or with the operation of the apparatus in other respects. The precipitated material will exist in the form of very finely divided particles having a tendency to remain in suspension, and the inner surfaces above the base with which solution which might contain suspended matter comes into contact are disposed at such angles that the degree of quiescence required to permit settling out can not be established.

Pregnant solution containing the absorbed sulphur dioxide flows downwardly from the lower portion of the absorber through the annular passage 16 and through the passage 22 into the lower portion of the liberating or stripping section 11. The pregnant solution is heated to its boiling point in the liberator or stripper by introducing steam at a suitable temperature into the heating coil 26 and header 33. The sulphur dioxide contained in the pregnant solution is stripped or liberated rapidly from the solution and passes upwardly through the stripper to the hood 34 and through the column of saturated solution in the conduit 35 to the gas separator 36. Sulphur dioxide from the gas separator flows through the outlet conduit 37 to suitable collection apparatus where it may be dried and otherwise treated to form a product suitable for use.

As stripping proceeds, solid boric acid which enters the stripper in suspension in the pregnant solution dissolves with regeneration of the borate. The solution in the stripper remains saturated with boric acid as it was when introduced into the apparatus originally.

The stripped solution passes upwardly through the central opening in the closure member 25 and to the top of the heat exchanger section where it enters the annular passage surrounding the air lift conduit 21 and flows to the air lift sump 42 in condition and position to be recirculated through the apparatus.

In passing upwardly through the heat exchanger section, the stripped solution passes in heat exchange relationship with the relatively cool pregnant solution flowing downwardly through the annular passage 16, heat being transferred readily through the thin steel wall of the inner cylinder 14. Thus, the hot stripped solution functions to heat the relatively cool pregnant solution to a temperature approaching the suitable stripping temperature, and the relatively cool pregnant solution functions to extract heat from the stripped solution and cool it to a temperature suitable for absorption. In using the apparatus for practicing the process of the invention, it is advisable to so control temperatures and rates of flow that the temperature of the pregnant solution remains below 85° C. until it passes into the stripper.

Temperature control will be aided by using fluid cooled baffles in the absorber, by passing or circulating a cooling fluid through the closed annular insulating space surrounding the air lift conduit 21 and by regulating the heat passing to the atmosphere from the absorber and the heat exchanger through the use of heating means or heat dissipating means.

As the stripped solution is cooled in passing upwardly through the heat exchanger, boric acid precipitates from the solution. The precipitated boric acid is in the form of finely divided particles which tend to remain in suspension and travel through the heat exchanger and through the air lift apparatus to the absorber with the true solution. Any tendency of these particles to separate and settle out is counter-acted by the dissolving action of the hot solution in the stripper. In operation, conditions within the apparatus adjust themselves to establish and maintain suitable equilibria between liquids and solids in the various parts of the apparatus.

We claim:

1. The process for recovering sulphur dioxide from gases containing the same which comprises treating the gases with an aqueous medium containing borax to absorb sulphur dioxide, heating the resulting aqueous medium in the presence of boric acid to liberate sulphur dioxide absorbed therein, and collecting the liberated sulphur dioxide, boric acid being employed in amount substantially sufficient to saturate the aqueous medium with respect thereto at the temperature of liberation of the sulphur dioxide.

2. The process for recovering sulphur dioxide from gases containing the same which comprises treating the gases with an aqueous absorption liquid containing borax and free boric acid to absorb sulphur dioxide, heating the resulting absorption liquid to liberate sulphur dioxide contained therein, and collecting the liberated sulphur dioxide, the free boric acid being employed in amount substantially sufficient to saturate the absorption liquid with respect to boric acid at the temperature of liberation of the sulphur dioxide.

3. The process for recovering sulphur dioxide from gases containing the same which comprises treating the gases with an aqueous absorption liquid containing borax and free boric acid to absorb sulphur dioxide, heating the resulting absorption liquid to liberate absorbed sulphur dioxide, and collecting the liberated sulphur dioxide, the free boric acid being employed in an amount in excess of that required to saturate the absorption liquid with respect to boric acid at the temperature of liberation of the sulphur dioxide.

4. The process for recovering sulphur dioxide from gases containing the same which comprises treating the gases with an aqueous absorption liquid containing borax and free boric acid to absorb sulphur dioxide, heating the resulting absorption liquid to liberate absorbed sulphur dioxide, and collecting the liberated sulphur dioxide, the borax being present in an amount in excess of that required to saturate the absorption liquid with respect thereto at the temperature of absorption of the sulphur dioxide and the free boric acid being employed in an amount substantially sufficient to saturate the absorption liquid with respect to boric acid at the temperature of liberation of the sulphur dioxide.

5. The processs for recovering sulphur dioxide from gases containing the same which comprises treating the gases with an aqueous absorption liquid containing borax and free boric acid to absorb sulphur dioxide, heating the resulting absorption liquid to liberate absorbed sulphur dioxide, and collecting the liberated sulphur dioxide, the borax being present in an amount in excess of that required to saturate the absorption liquid with respect thereto at the absorption temperature and the free boric acid being present in an amount in excess of that required to saturate the absorption liquid with respect thereto at the temperature of liberation of sulphur dioxide.

6. The process for recovering sulphur dioxide from gases containing the same which comprises treating the gases with an aqueous medium containing borax at a temperature in the range of about 45° C. to 75° C. to absorb sulphur dioxide, heating the resulting aqueous medium to a temperature higher than about 85° C. in the presence of free boric acid to liberate absorbed sulphur dioxide, and collecting the liberated sulphur dioxide, the free boric acid being present in amount substantially sufficient to saturate the aqueous medium with respect thereto at the temperature of liberation of the sulphur dioxide.

7. The process for recovering sulphur dioxide from gases containing the same which comprises treating the gases with an aqueous medium containing borax and free boric acid at a temperature in the range of about 45° C. to 75° C. to absorb sulphur dioxide, heating the resulting aqueous medium to a temperature higher than about 85° C. to liberate absorbed sulphur dioxide, and collecting the liberated sulphur dioxide, the free boric acid being present in amount substantially sufficient to saturate the aqueous medium with respect thereto at the temperature of liberation of the sulphur dioxide.

RAYMOND F. BACON.
ROCCO FANELLI.